(12) United States Patent
Weppler (10) Patent No.: US 10,830,688 B2
(45) Date of Patent: Nov. 10, 2020

(54) CLIMATE-TESTING DEVICE

(71) Applicant: WEISS UMWELTTECHNIK GMBH, Reiskirchen (DE)

(72) Inventor: Michael Weppler, Grünberg (DE)

(73) Assignee: WEISS UMWELTTECHNIK GMBH, Reiskirchen (DE)

( * ) Notice: Subject to any disclaimer, the term of this patent is extended or adjusted under 35 U.S.C. 154(b) by 240 days.

(21) Appl. No.: 16/068,718

(22) PCT Filed: Jan. 4, 2017

(86) PCT No.: PCT/EP2017/050114
§ 371 (c)(1),
(2) Date: Jul. 9, 2018

(87) PCT Pub. No.: WO2017/125262
PCT Pub. Date: Jul. 27, 2017

(65) Prior Publication Data
US 2019/0025188 A1    Jan. 24, 2019

(30) Foreign Application Priority Data
Jan. 18, 2016 (DE) .......................... 10 2016 200 538

(51) Int. Cl.
*G01N 17/00* (2006.01)
(52) U.S. Cl.
CPC .................................. *G01N 17/002* (2013.01)
(58) Field of Classification Search
CPC ...................................................... G01N 17/002
(Continued)

(56) References Cited

U.S. PATENT DOCUMENTS

| 3,306,692 A | 2/1967 | Timmerman et al. |
| 4,461,519 A | 7/1984 | Hildebrandt et al. |

(Continued)

FOREIGN PATENT DOCUMENTS

| CN | 1118637 A | 3/1996 |
| CN | 201005355 Y | 1/2008 |

(Continued)

OTHER PUBLICATIONS

English Abstract Translation of CN201005355Y dated Jan. 16, 2008.
English Abstract Translation of CN101443720A dated May 27, 2009.

*Primary Examiner* — Daniel S Larkin
(74) *Attorney, Agent, or Firm* — King & Schickli, PLLC (57) ABSTRACT

The invention relates to a climate testing device (15) and to a climate testing device kit for forming a climate testing device, in particular a corrosion testing device or the like, comprising a test-chamber module (16) having a test space which can be closed off from the surroundings and which serves to receive test specimens, a tank module (12) having a container for receiving a corrosive liquid, a control module (13) having a controller for carrying out a test cycle, and a housing assembly (17) for at least partially accommodating the test space, the container and the controller, wherein the climate testing device comprises a frame assembly, the frame assembly being composed of spaced-apart parallel frame carriers and frame profiles, the frame profiles interconnecting the frame carriers, the frame profiles and the frame carriers forming spatially separate module seats for the test space, the container and the controller.

17 Claims, 5 Drawing Sheets

(58) Field of Classification Search
USPC .............................................................. 73/86
See application file for complete search history.

(56) References Cited

U.S. PATENT DOCUMENTS

| | | | | |
|---|---|---|---|---|
| 4,812,750 | A * | 3/1989 | Keel | G01M 99/002 |
| | | | | 312/296 |
| 5,695,263 | A | 12/1997 | Knurr-Mechanik | |
| 5,851,143 | A * | 12/1998 | Hamid | G01N 17/002 |
| | | | | 454/57 |
| 6,019,446 | A | 2/2000 | Laboch et al. | |
| 6,363,621 | B1 * | 4/2002 | James, Jr. | G01B 5/285 |
| | | | | 33/533 |
| 9,551,646 | B2 * | 1/2017 | Matsuguma | G01N 17/002 |
| 2004/0232145 | A1 * | 11/2004 | Antal, Sr. | B65D 81/056 |
| | | | | 220/4.33 |
| 2014/0124468 | A1 | 5/2014 | Lundrigan et al. | |
| 2015/0185172 | A1 * | 7/2015 | Kisela | G01M 99/002 |
| | | | | 374/44 |

FOREIGN PATENT DOCUMENTS

| | | | |
|---|---|---|---|
| CN | 101443720 A | 5/2009 | |
| CN | 103439246 A | 12/2013 | |
| CN | 204107520 U | 1/2015 | |
| DE | 19915906 A1 | 10/2000 | |
| DE | 102009004822 A1 | 9/2010 | |
| JP | 56-081437 * | 7/1981 | ............. G01N 17/00 |

* cited by examiner

CLIMATE-TESTING DEVICE

FIELD OF THE INVENTION

The invention relates to a climate testing device and to a climate testing device kit for forming a climate testing device, in particular a corrosion testing device or the like, comprising a testing-chamber module having a test space which can be closed off from the surroundings and which serves to receive test specimens, a tank module having a container for receiving a corrosive liquid, a control module having a controller for carrying out a test cycle, and a housing assembly for at least partially accommodating the test space, the container and the controller.

BACKGROUND OF THE INVENTION

Climate testing devices or corrosion test cabinets of this kind are commonly used for corrosion testing of products or test specimens. During these tests, the test specimens are exposed to a corrosive liquid, such as brine, within a test space that can be sealed off from the surroundings. The corrosive liquid is precipitated onto the test specimens as spray mist. Furthermore, the test space can typically also be heated, allowing defined climatic conditions to be formed in the test space in terms of air temperature and relative humidity.

The corrosive liquid is usually stored in a container of the climate testing device and is transported into the test space in the required amount during a test cycle. The test space has an outlet via which the condensed and dripping liquid can be discharged from the test space. Moreover, the climate testing device comprises a controller for carrying out a test cycle in a predetermined manner. The controller may comprise a control cabinet having a voltage supply, a control device for controlling device components and reading sensors, means for data processing, and an operating device for manually operating the climate testing device.

In known climate testing devices, the test space, the container and the controller are disposed within a housing of the climate testing device. The most amount of space in the housing is taken up by the test space, which is formed in the manner of a vat or chest that can be closed using a test space lid. The controller and its components can be disposed on the housing in the most space-saving manner possible. Also, the container can have a shape that matches or is molded to the shape of the test space. For example, the container can cling to the test space at the sides and at the bottom thereof. This allows for shortest possible line paths to be formed between the test space and the container as well as the components of the controller. For example, individual components of the controller can be disposed in different places within the housing that are related to the respective individual component or that simply offer free space. In this way, a particularly compact design of the climate testing device can be achieved. Since climate testing devices of this kind are also produced in different sizes and with differently sized test spaces, an installation of the individual components that matches a respective size is required at all times. Furthermore, a housing, a controller and, if applicable, a container need to be adapted to a test space size each time. Hence, producing and installing climate testing devices in different sizes is complex.

SUMMARY OF THE INVENTION

Therefore, the object of the invention is to propose a climate testing device and a climate testing device kit that allow cost-effective production of climate testing devices.

The climate testing device according to the invention, in particular a corrosion testing device or the like, comprises a testing-chamber module having a test space which can be closed off from the surroundings and which serves to receive test specimens, a tank module having a container for receiving a corrosive liquid, a control module having a controller for carrying out a test cycle, and a housing assembly for at least partially accommodating the test space, the container and the controller, wherein the climate testing device comprises a frame assembly, the frame assembly being composed of spaced-apart parallel frame carriers and frame profiles, the frame profile interconnecting the frame carriers, the frame profiles and the frame carriers forming spatially separate module seats for the test space, the container and the controller.

The fact that the climate testing device comprises a frame assembly allows the test space and the controller to be disposed completely separately from each other in frame sections each formed by the frame assembly. The frame assembly consists of frame carriers and frame profiles, the frame carriers being disposed perpendicular or orthogonal to a longitudinal extension of the climate testing device and the frame profiles being disposed along said longitudinal extension. The frame profiles connect the frame carriers to each other and space them apart from each other in such a manner that the frame sections, i.e. the module seats, for receiving the test space, the container or the controller are formed between the frame carriers. The formation of said module seats and the thus possible spatial separation of the test space, the container and the controller result in a modular structure of the climate testing device, whereby production of the climate testing device becomes simpler and more cost-effective. The frame assembly can support the test space, the container, the controller and/or the housing assembly. This consequently allows the frame assembly not only to separate the test space, the container and the controller but also to serve the installation of the test space, the container and the controller as well as the housing assembly. For instance, the test space can be placed and installed in the module seat designed for this purpose, which allows a load of the test space to be dissipated via the frame assembly. At the same time, the frame assembly can serve as an installation base for the housing assembly. Accordingly, the housing assembly can completely cover the frame assembly.

The frame carriers can be disposed in such a manner that the frame carriers spatially separate the test space, the container and the controller from one another. The spatial separation allows for flexible production of climate testing devices in the form of embodiments in which the test space, the container and the controller can be designed independently from each other in terms of their size. For instance, it is possible to use a container and a controller of the same construction in each case for different sizes of test spaces and to install them independently of each other. Also, a size of the climate testing device can be easily determined by designing the lengths of the frame profiles according to a size of the respective test space, container or controller. Consequently, all that is required for forming the frame assembly is to dispose the frame carriers in their relative distance that matches the test space, the container and the controller and to connect them to the frame profiles. In this context, it is envisaged in particular that the same frame carriers and frame profiles will be used each time for all embodiments of the climate testing device. All in all, this allows for a significant reduction of the number of parts for one series of differently sized climate testing devices.

It is particularly advantageous for the frame carrier to be formed in one piece from a plastic material. In this case, the frame carrier is particularly resistant to the corrosive liquid, which may be brine, for example. The one-piece design can be achieved in a particularly cost-effective manner by transfer molding of the plastic material (RTM process).

The frame carrier can also have a foam core and/or the plastic material can be fiber-reinforced. The foam core can be a PU foam core and serve to thermally insulate the frame carrier. The fiber reinforcement of the plastic material makes the frame carrier particularly stable and allows it to be of a filigree design.

For instance, the frame carrier can be formed as a truss. Accordingly, the frame carrier can have a plurality of bars which are permanently connected to each other. In this way, the frame carrier becomes particularly stable and can have relatively low weight at the same time.

The frame carrier can be composed of vertical beams and horizontal beams. The vertical beams and the horizontal beams can then form a rectangular or square frame. It may be provided for the vertical beams and the horizontal beams to be connected by cross struts, making the frame carrier even more stable.

Passage openings or panels can be formed in the beams, wherein a frame profile can be form-fittingly inserted into at least one passage opening. Preferably, each frame carrier has at least four passage openings into which a frame profile can be inserted. Advantageously, a cross-section of the passage openings matches a cross-section of the frame profile, allowing the frame profile to penetrate the passage opening in a formfitting manner. The beams can additionally have a plurality of other passage openings or panels, whose dimensions are adapted for a passage of cables, tubes and other conduits. This also enables the frame carriers to be used as an integral part of the climate testing device and as an installation aid.

Foot protrusions may be formed on a beam, wherein an adjusting device for horizontally aligning the frame assembly can be disposed on each foot protrusion. The foot protrusions are preferably molded to an underside of the frame carriers, making placement of the climate testing device on a ground easier. Also, the entire load of the climate testing device can be dissipated via the respective foot protrusions. The adjusting device can be an insert within a foot protrusion, for example, which can be screwed into or out of the foot protrusion by mean so of a screw thread. The insert can then serve as a height-adjustable foot. This allows the climate testing device to be placed in horizontal alignment on uneven or sloping ground, for example. Also, the foot protrusions further facilitate installation of the climate testing device because there is no need to first install feet under a housing of the climate testing device.

The frame profile can be an extruded metal profile. For example, the frame profile can be an extruded aluminum profile, which is available in almost any cross-section and in any required length at little cost. A cross-section of the extruded profile can be designed in such a manner that the cross-section is substantially square or rectangular and has mounting grooves at its side faces for receiving screw heads or the like. The frame profiles can then be mounted with the frame carrier in a particularly simple manner by screwing or clamping.

The housing assembly can comprise housing plates, which may be attached to the frame carriers, wherein the dimensions of the housing plates can match the dimensions of the module seats. Thus, it is no longer necessary to produce different housings for climate testing devices of different size; instead, all that is needed are differently sized housing plates for the respective module seats. This also means that the housing, i.e. the housing assembly, of the climate testing device is of a modular design and thus more variable and producible at less cost. For installation or inspection purposes, it is also possible in this case, in particular, to remove only the housing plate of a module seat that has to be removed for a maintenance task, for example.

Advantageously, the housing plate can have a foam core. The housing plates of the testing-chamber module in particular can have a foam core, which thermally insulates the testing chamber. The housing plate can also be produced by transfer molding.

Attaching the housing plates to the frame carrier becomes particularly easy if attachment means are form-fittingly embedded in the housing plate and if attachment sockets for the attachment means are formed on the frame carrier. During production of the housing plate, for example, the attachment means can simply be placed into a mold of the housing plate and thus be embedded in the housing plate. The attachment means can be hinges or bolt-shaped protrusions that engage into correspondingly designed attachment sockets or recesses in the frame carrier or can lock with it. A special installation of the attachment means on the housing plate, such as by screwing, is no longer necessary in this case. Also, an outer surface of the housing plate can be designed particularly even and thus easily cleanable.

The test space can be formed by a vat or a chest having a closable test space lid. The test space lid can be part of the housing assembly or can be additionally covered with a housing plate which matches the shape of the test space lid. The vat or chest can be made of a plastic material, wherein the test space lid can rest on the vat or chest in a sealing manner. The vat or chest can then be filled with test specimens from the top, wherein an outlet for the corrosive liquid can be provided at an underside of the vat or of the chest.

The vat or chest can also have bearing protrusions which can rest on the frame profiles. For instance, the frame profiles can be disposed on the frame carriers in such a manner that they extend below the vat or chest. The bearing protrusions can be molded to the vat or chest, allowing the vat or chest to rest directly on the frame profiles. In this way, installation of the vat or chest is significantly simplified because no special attachment means or means for dissipating a load of the vat or chest need to be used.

The container can have rollers, wherein the container can then be movable on a ground by means of the rollers. For example, the container may have three to four rollers and be moved into or out of the climate testing device by means of the rollers. A corrosive liquid can then be treated and be filled into the container outside of the climate testing device and at a location remote from the installation location of the climate testing device, respectively. Separate transport of corrosive liquid to the climate testing device, such as in canisters from which the stationary container is then filled, is no longer necessary in this case. The module seat of the container can be configured in such a manner that a frame profile has a cut-out between two frame carriers so that the container can be pushed into the climate testing device through the space between the two frame carriers.

The control module can be attached to one frame carrier on its own and can be configured to be pivotable, at least in part, about a vertical axis. Consequently, the control module or the controller does not necessarily have to be disposed between two frame carriers; instead, it is sufficient to attach the control module to one frame carrier alone. In order to enable easy access to the controller or to a control cabinet, it is advantageous for the control module to be pivotably attached to the frame carrier. For example, the entire control module can be attached to the frame carrier by means of hinges, allowing the controller to be opened by flipping open or pivoting the control module. Alternatively, it may be provided for the control module to be only partially pivotable, such as by permanent installation of a control cabinet of the control module on the frame carrier or on the frame profiles, in which case parts of the controller can be configured pivotable on the frame profiles or on the control cabinet. In this way, installation and maintenance is facilitated by improved accessibility of the controller. Potentially present operating elements of an operating device of the controller can be permanently disposed above the pivotable part of the controller.

The climate testing device kit according to the invention for forming a climate testing device according to the invention comprises a testing-chamber module having a test space, a tank module having a container, a control module having a controller, three frame carriers and four frame profiles, a length of the frame carriers being dimensioned such that the test space and the container can each be disposed between frame carriers, the controller being disposable on one frame carrier.

Thus, it is possible to produce climate testing devices of any length using no more than three frame carriers and four frame profiles. The adaption to a respective length happens by simply cutting to length four frame profiles of the same cross-section. Regarding the advantages of the climate testing device kit according to the invention, reference is made to the description of advantages of the climate testing device according to the invention.

DETAILED DESCRIPTION OF THE INVENTION

Figure 1:
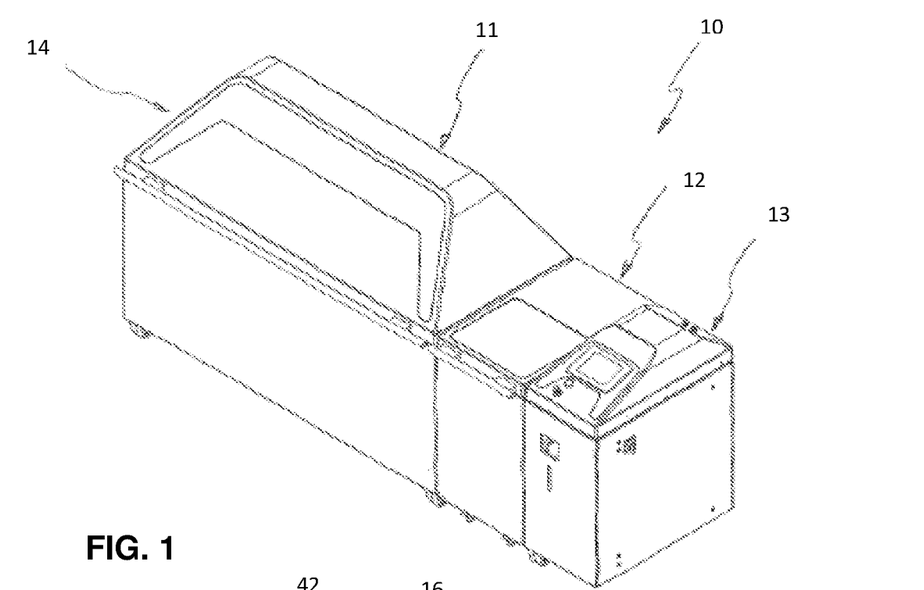
FIG. 1 is a perspective illustration showing a first embodiment of a climate testing device.
Figure 2:
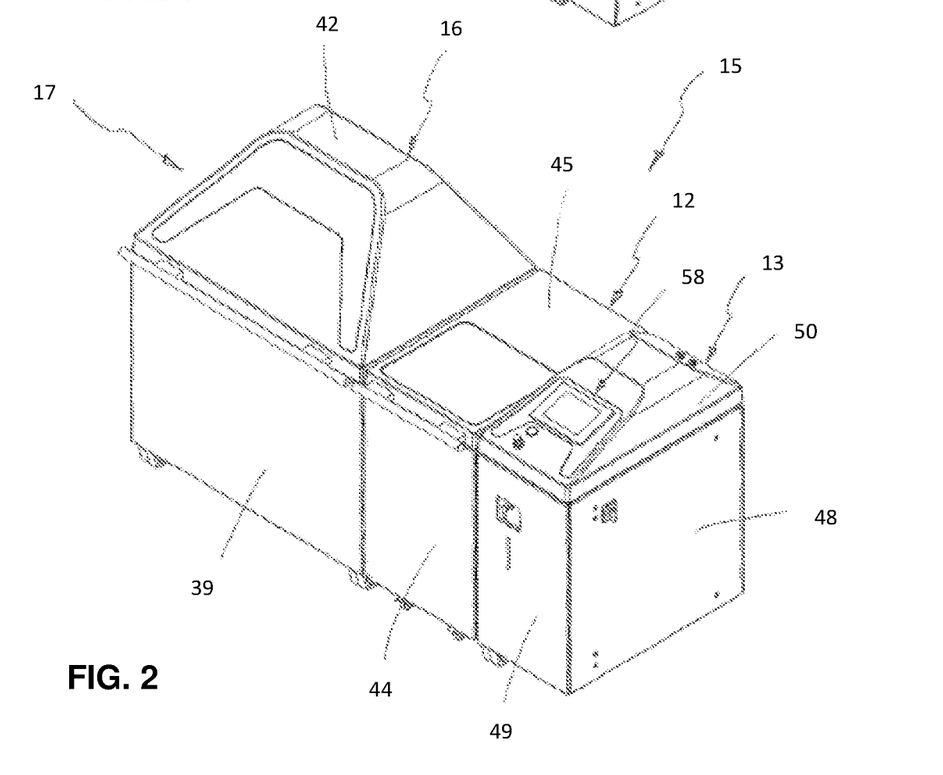
FIG. 2 is a perspective illustration showing a second embodiment of a climate testing device.
Figure 3:
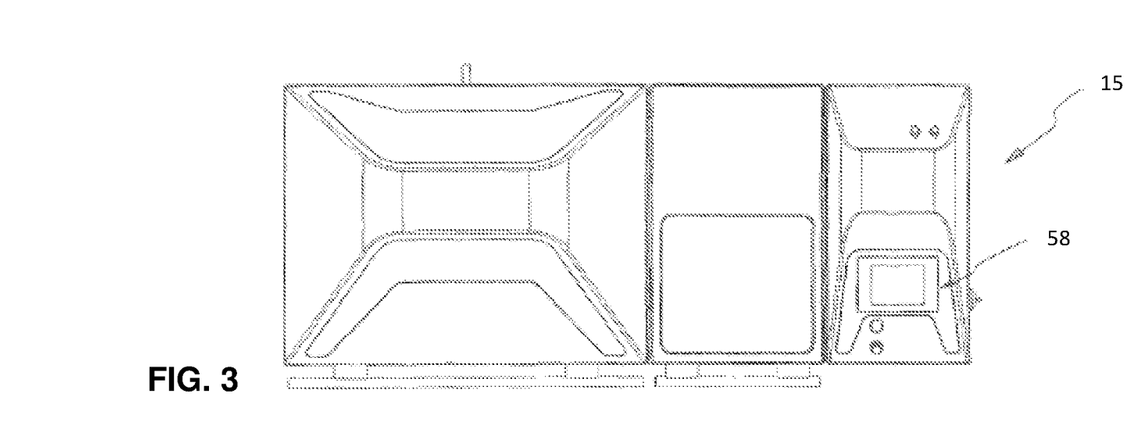
FIG. 3 is a top view of the climate testing device of FIG. 2.
Figure 4:
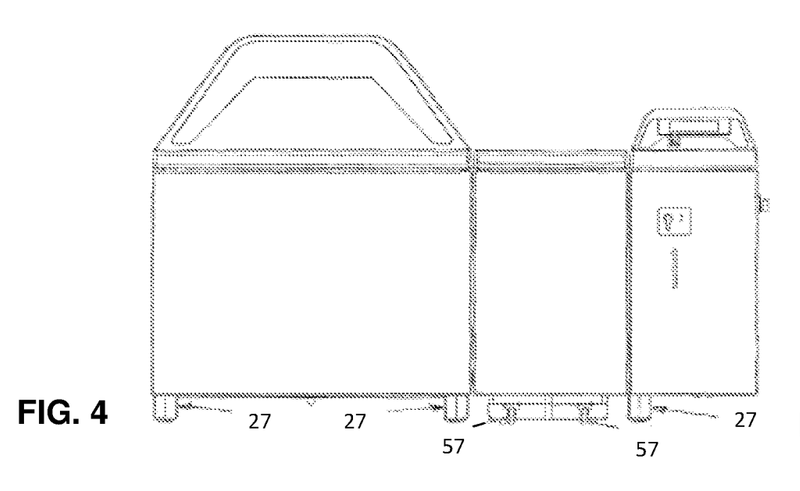
FIG. 4 is a front view of the climate testing device of FIG. 2.
Figure 5:
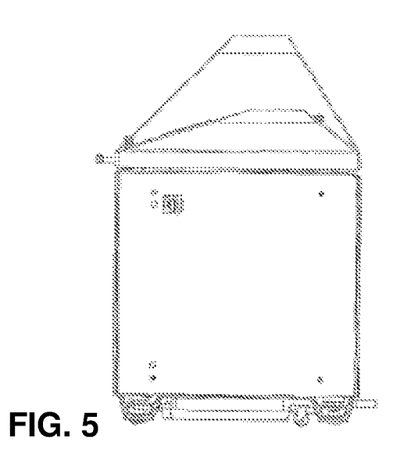
FIG. 5 is a side view of the climate testing device of FIG. 2 from the right.
Figures 6, 7, 8:
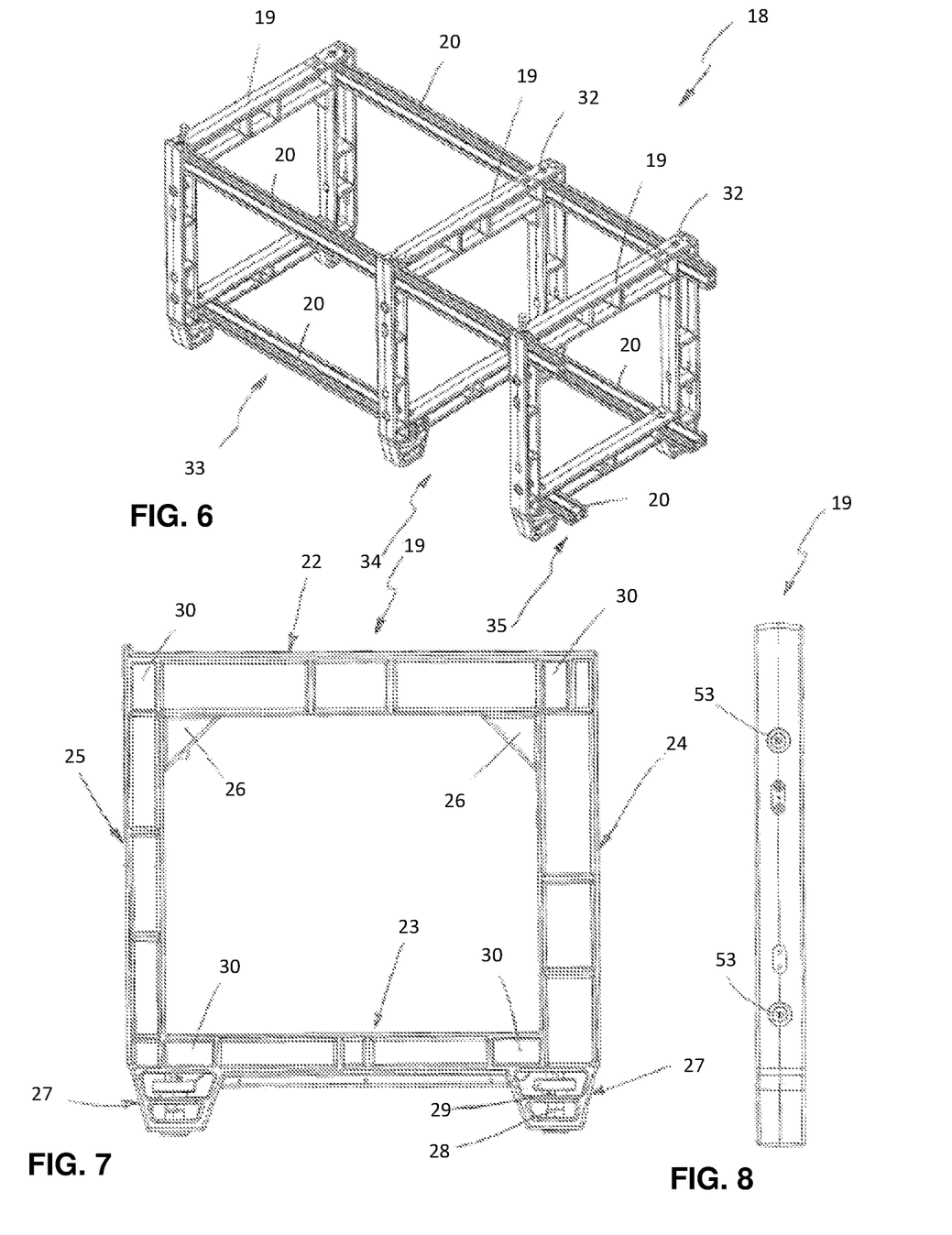
FIG. 6 is a perspective illustration showing a frame assembly of the climate testing device of FIG. 2.
FIG. 7 is a side view of the frame carrier of the frame assembly of FIG. 6.
FIG. 8 is a front view of the frame carrier.
Figure 9:
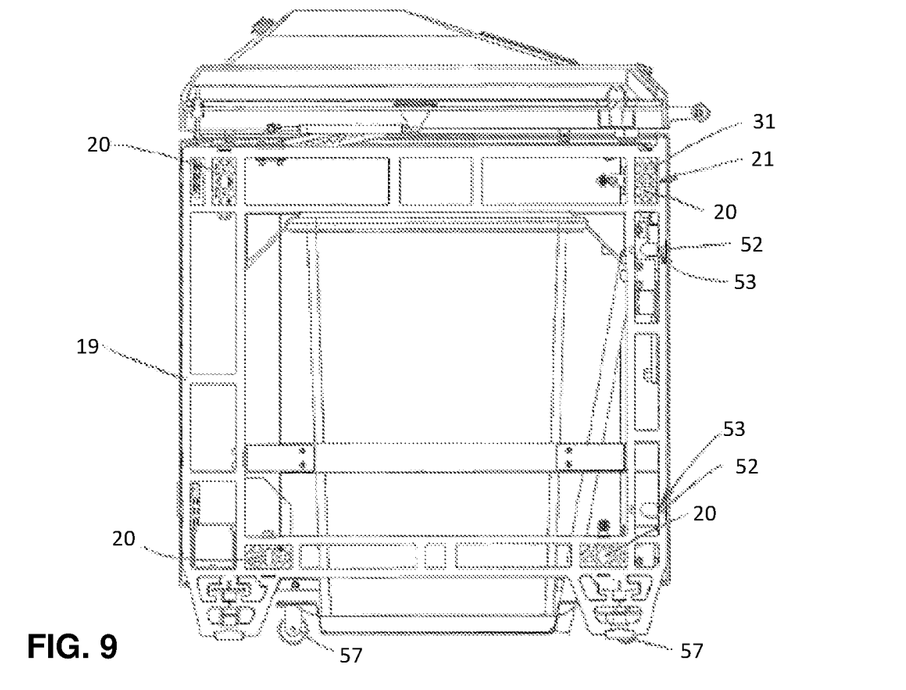
FIG. 9 is a cross-sectional view of the climate testing device of FIG. 2.
Figure 10:
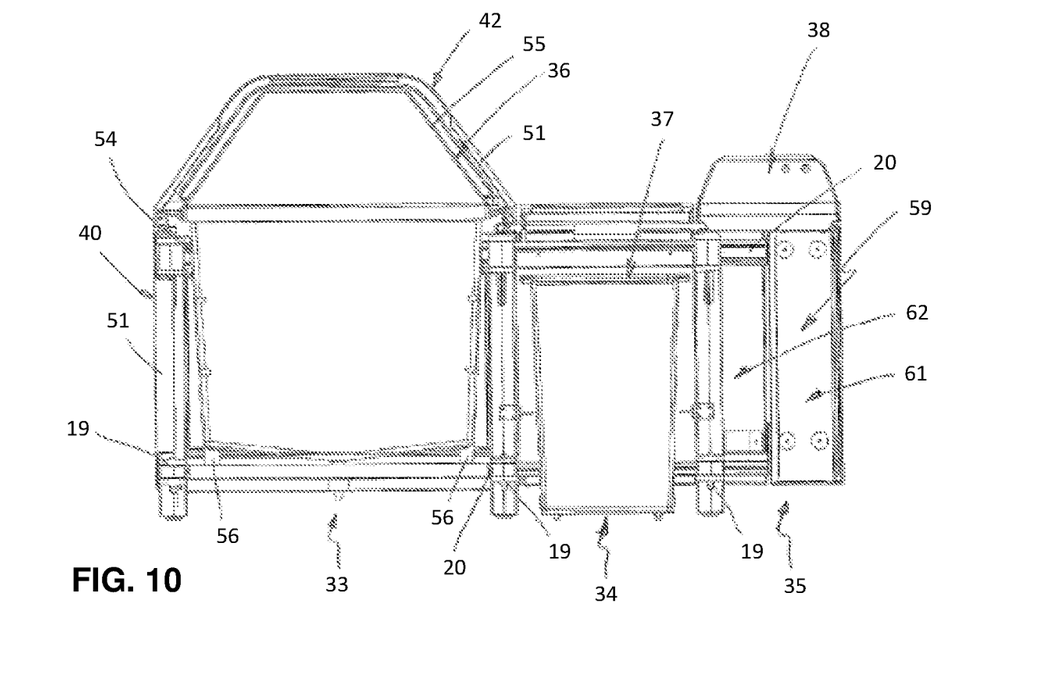
FIG. 10 is a vertical longitudinal section view of the climate testing device of FIG. 2.
Figure 11:
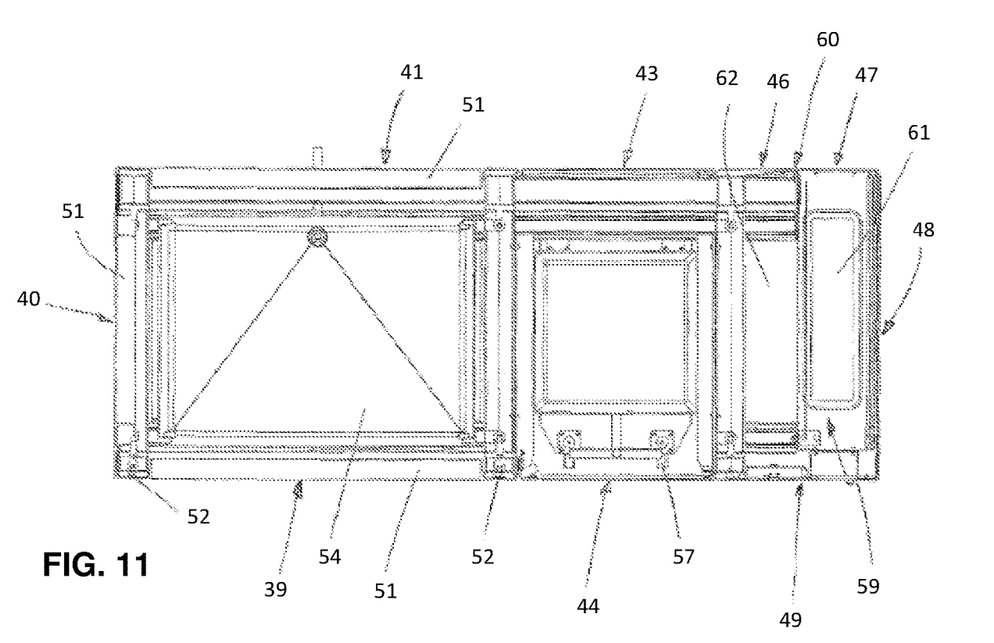
FIG. 11 is a horizontal longitudinal-section view of the climate testing device of FIG. 2.

FIG. 1 shows a first embodiment of a climate testing device 10, comprising a testing-chamber module 11, a tank module 12, and a control module 13. A test space (not illustrated) is hidden under a housing assembly 14 of the climate testing device. FIG. 2 shows a second embodiment of a climate testing device 15 having a testing-chamber module 16, the tank module 12 and the control module 13. Here, too, a test space (not illustrated) is hidden under a housing assembly 17 of the climate testing device 15. Compared to the climate testing device of FIG. 1, the testing-chamber module 16 of climate testing device 15 is shorter, while the tank module 12 and the control module 13 are substantially identical.

A combined view of FIGS. 3 to 11 shows the climate testing device 15 in different views and illustrations. The climate testing device 15 comprises a frame assembly 18 which is formed by respectively matching frame carriers 19 and frame profiles 20 having matching cross-sections 21. The frame carriers 19 are formed in one piece by transfer molding of a fiber-reinforced plastic material. The frame carrier 19 has a horizontal upper beam 22, a horizontal lower beam 23, a vertical frontal beam 25 and a vertical rear beam 24. Struts 26 reinforce a connection of the horizontal upper beam 22 to the vertical frontal beam 25 and the vertical rear beam 24. Foot protrusions 27 are molded to the horizontal lower beam 23. Adjusting elements 28 having a screw thread (not illustrated) and a nut 29 are inserted into each foot protrusion 27. Turning the nut 29 causes a translational movement of the adjusting element 28 out of or into the foot protrusion 27, allowing the frame assembly 18 to be positioned horizontally on a ground.

Furthermore, the frame carrier 19 has passage openings 30 which match the cross-section 21 of the frame profiles 20 in such a manner that the frame profiles 20 can be slid through the passage openings 30 while being simultaneously surrounded by the frame carrier 19 in a formfitting manner. The frame profiles 20 have longitudinal grooves 31 into which the attachment means 32 can be inserted. The frame carriers 19 can then be screwed to the frame profiles 20 by means of the attachment means 32. The frame carriers 19 and the frame profiles 20 are connected to each other in such a manner that the frame carriers 19 are spaced apart from each other in such a manner that spatially separate module seats 33, 34, 35 for a test space 36 of the testing-chamber module 16, for a container 37 of the tank module 12 and for a controller 38 of the control module 13 are formed. The test space 36 and the container 37 are each disposed between frame carriers 19, the controller 38 being disposed on one frame carrier 19 only.

The housing assembly 17 is composed of a plurality of housing plates 39 to 50 which at least partially cover the test space 36, the container 37 and the controller 38. Housing plates 39 to 42 in particular are configured to have a foam core 51, whereby additional insulation of the test space 36 is provided. The housing plates 39 to 50 are attached to the frame carriers 19. As illustrated here using the example of housing plate 39, housing plate 39 has attachment bolts 52 which are embedded in housing plate 39. In frame carrier 19, matching attachment sockets 53 into which the attachment bolts 52 can be inserted are formed. In this way, simple attachment of housing plate 39 allowing easy installation and removal can be provided.

The test space 36 is formed by a vat 54 which is tightly closed by a test space lid 55. Within the test space 36, i.e. within the vat 54 having the test space lid 55, a corrosive liquid (not illustrated) is precipitated onto test specimens (not illustrated). The vat 54 is made of a plastic material and has molded-on feet 56 which rest directly on two frame profiles 20. In this way, a particularly simple installation of the vat 54 is made possible.

The container 37 is equipped with rollers 57, allowing the container 37 to be easily moved across a ground (not illustrated). The container 37 serves to store the corrosive liquid. To be able to slide the container 37 into the module seat 34, one of the frame profiles 20 is cut-out or interrupted in the area of the module seat 34. The container 37 can be removed and handled through the opening of housing plates 44 and 45.

The controller 38 comprises an operating device 58 incorporated in housing plate 50 from outside for operating the climate testing device 15, and a control cabinet 59 below the operating device 58. The control cabinet 59 has a controlling device, means for data processing, and a voltage supply (not illustrated). The control cabinet 59 is designed to be partable between housing plates 46 and 47 by means of hinges 60, i.e. a pivotable part 61 can be pivoted relative to a fixed part 62 of the controller 38 in such a manner that the controller 38 can be opened and both the pivotable part 61 and the fixed part 62 become accessible. Hence, only the fixed part 62 of the controller 38 is permanently installed on the frame carrier 19 and on the frame profiles 20.

The invention claimed is:

1. A climate testing device (10, 15), comprising a test-chamber module (11, 16) having a test space (36) which can be closed off from the surroundings and which serves to receive test specimens, a tank module (12) having a container (37) for receiving a corrosive liquid, a control module (13) having a controller (38) for carrying out a test cycle, and a housing assembly (14, 17) for at least partially accommodating the test space, the container and the controller, wherein the climate testing device comprises a frame assembly (18), the frame assembly being formed by spaced-apart parallel frame carriers (19) and frame profiles (20), the frame profiles interconnecting the frame carriers, the frame profiles and the frame carriers forming spatially separate module seats (33, 34, 35) for the test space, the container and the controller;
wherein at least one of the frame carriers (19) is composed of vertical beams (24, 25) and horizontal beams (22, 23), and wherein passage openings (30) are formed in the beams (22, 23, 24, 25), at least one of the frame profiles (20) being form-fittingly inserted into at least one passage opening.

2. The climate testing device according to claim 1, characterized in that the frame assembly (18) supports the test space (36), the container (37), the controller (38) and/or the housing assembly (14, 17).

3. The climate testing device according to claim 1, characterized in that the frame carriers (19) are disposed in such a manner that the frame carriers spatially separate the test space (36), the container (37) and the controller (38) from one another.

4. The climate testing device according to claim 1, characterized in that at least one of the frame carriers (19) is formed in one piece from a plastic material.

5. The climate testing device according to claim 4, characterized in that at least one of the frame carriers (19) has a foam core and/or the plastic material is fiber-reinforced.

6. The climate testing device according to claim 1 characterized in that at least one of the frame carriers (19) is formed as a truss.

7. The climate testing device according to claim 1, characterized in that foot protrusions (27) are molded to one beam (23), an adjusting device for horizontally aligning the frame assembly (18) being disposed on each foot protrusion.

8. The climate testing device according to claim 1, characterized in that at least one of the frame profiles (20) is an extruded metal profile.

9. The climate testing device according to claim 1, characterized in that the housing assembly (14, 17) comprises housing plates (34, 35, 36, 37, 38, 39, 40, 41, 42, 43, 44, 45, 46, 47, 48, 49, 50) which are attached to the frame carriers (19), the dimensions of the housing plates matching dimensions of the module seats (33, 34, 35).

10. The climate testing device according to claim 9, characterized in that each housing plate (34, 35, 36, 37, 38, 39, 40, 41, 42, 43, 44, 45, 46, 47, 48, 49, 50) has a foam core (51).

11. The climate testing device according to claim 9, characterized in that attachment means (52) are form-fittingly embedded in each housing plate (34, 35, 36, 37, 38, 39, 40, 41, 42, 43, 44, 45, 46, 47, 48, 49, 50) and that attachment sockets (53) for the attachment means are formed on each frame carrier (19).

12. The climate testing device according to claim 1, characterized in that the test space (36) is formed as a vat (54) or chest having a closable test space lid (55).

13. The climate testing device according to claim 12, characterized in that the vat (54) or chest has bearing protrusions (56) which rest on the frame profiles (20).

14. The climate testing device according to claim 1, characterized in that the container (37) has rollers (57), the container being movable on a ground by means of said rollers.

15. The climate testing device according to claim 1, characterized in that the control module (13) is attached to one frame carrier (19) on its own and is configured to be pivotable, at least in part, about a vertical axis.

16. A climate testing device kit for forming a climate testing device (10, 15) according to claim 1, wherein the spaced-apart parallel frame carriers (19) comprise three frame carriers (19), wherein the frame profiles (20) comprise four frame profiles (20), a length of the frame carriers being dimensioned such that the test space and the container can each be disposed between frame carriers, the controller being disposable on one of the frame carriers.

17. A climate testing device (10, 15) comprising a test-chamber module (11, 16) having a test space (36) which can be closed off from the surroundings and which serves to receive test specimens, a tank module (12) having a container (37) for receiving a corrosive liquid, a control module (13) having a controller (38) for carrying out a test cycle, and a housing assembly (14, 17) for at least partially accommodating the test space, the container and the controller, wherein the climate testing device comprises a frame assembly (18), the frame assembly being formed by spaced-apart parallel frame carriers (19) and frame profiles (20), the frame profiles interconnecting the frame carriers, the frame profiles and the frame carriers forming spatially separate module seats (33, 34, 35) for the test space, the container and the controller;
wherein the control module (13) is attached to one frame carrier (19) on its own and is configured to be pivotable, at least in part, about a vertical axis.

* * * * *